United States Patent [19]

Haitko

[11] Patent Number: 4,587,327

[45] Date of Patent: May 6, 1986

[54] METHOD FOR PREPARING POLYPHENYLENE OXIDE WITH COPPER (I) COMPLEX CATALYSTS

[75] Inventor: Deborah A. Haitko, Schenectady, N.Y.

[73] Assignee: General Electric Company, Schenectady, N.Y.

[21] Appl. No.: 652,532

[22] Filed: Sep. 20, 1984

[51] Int. Cl.⁴ .............................................. C08G 65/44
[52] U.S. Cl. ..................... 528/215; 528/212; 528/214; 528/216; 528/217; 528/218; 556/113
[58] Field of Search ......................... 528/212, 214–218

[56] References Cited

U.S. PATENT DOCUMENTS

| | | |
|---|---|---|
| 4,028,341 | 7/1977 | Hay ...................................... 528/215 |
| 4,032,512 | 6/1977 | Bennett et al. ...................... 528/215 |
| 4,059,568 | 11/1977 | Cooper ................................ 528/212 |
| 4,196,278 | 4/1980 | Bennett, Jr. et al. ................ 528/215 |
| 4,482,697 | 11/1984 | Haitko ................................. 528/215 |

*Primary Examiner*—Lester L. Lee
*Attorney, Agent, or Firm*—Richard J. Traverso; James C. Davis, Jr.; James Magee, Jr.

[57] ABSTRACT

Methods for preparing copper(I)-diamine-phenoxide complexes within solution, such as the polymerization medium of polyphenylene oxides, are described which utilize a copper-diamine-halide complex, an alkali metal hydroxide and a monohydroxy aromatic compound to generate effective catalysts without the scrupulous exclusion of moisture and air.

12 Claims, No Drawings

METHOD FOR PREPARING POLYPHENYLENE OXIDE WITH COPPER (I) COMPLEX CATALYSTS

CROSS-REFERENCE TO RELATED APPLICATIONS

This invention is related to application Ser. No. 572,036 assigned to the same assignee as the present invention, the contents of which are incorporated herein by reference.

BACKGROUND OF THE INVENTION

This invention relates to methods for producing copper(I)-diamine complexes in solution and methods for producing polyphenylene oxides by the oxidative coupling of phenols utilizing copper(I)-diamine complexes formed in the polymerization medium to effect the reaction.

Polyphenylene oxides, sometimes known as polyphenylene ethers, are well known polymers useful as industrial resins. These polymers, both homopolymers and copolymers and processes for producing them are disclosed in U.S. Pat. Nos. 3,306,874; 3,306,875; 3,733,299 and 4,028,341, which are hereby incorporated herein by reference.

These polymers are typically prepared by the oxidative coupling of phenols in the presence of copper-halide-amine complex catalysts. Phenols which can be oxidatively coupled to provide polymers have the structural formula:

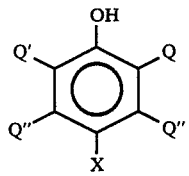

where x is hydrogen, chlorine, bromine or iodine; Q is hydrogen, hydrocarbon radicals, halohydrocarbon radicals having at least two carbon atoms between the halogen atom and phenol nucleus, hydrocarbonoxy radicals and halohydrocarbonoxy radicals having at least two carbon atoms between the halogen atom and the phenol nucleus; and Q' and Q'' are selected from the same group as Q, and in addition, halogen, provided that Q, Q' and Q'' are all free of a tertiary α-carbon atom.

A number of copper-halide amine catlyst systems have been disclosed. These are typically prepared prior to polymerization by blending cuprous or cupric oxide with a halide source, usually a hydrogen halide such as HCl or HBr, with one or more amines in the presence of an organic solvent. Suitable amines include tertiary or secondary alkaline diamines, secondary monoamines, primary monoamines, tetriary monoamines and mixtures thereof. Suitable amine mixtures are disclosed in U.S. Pat. Nos. 3,306,874; 3,306,875; 3,941,266; 3,988,287; 4,028,341 and 4,054,553.

In copending application Ser. No. 572,036 new copper(I)-diamine-phenoxide complexes which are useful for polyphenylene oxide preparation are disclosed. These complexes, represented by the formula below, are a single catalyst species which can be prepared in substantially pure, crystalline form.

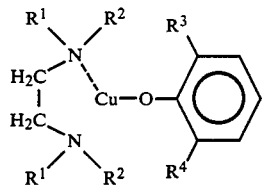

The radical $R^1$ is hydrogen or alkyl, $R^2$ is an alkyl radical, with the provisos that (1) $R^1$ and $R^2$ taken together contain 4 to 6 carbon atoms and (2) when $R^1$ is hydrogen, $R^2$ is tertiary alkyl, and each of $R^3$ and $R^4$ is independently selected from hydrogen or methyl radicals.

Complexes of this structure are prepared by first reacting cuprous chloride with a diamine of the formula:

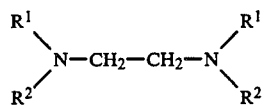

to form a copper(I)-diamine-chloride complex.

The copper(I)-diamine-phenoxide comlexes are obtained by reacting an alkali metal salt of a hydroxy aromatic compound of the formula below with the copper(I)-diamine-chloride complex described above.

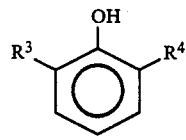

This reaction requires scrupulous exclusion of moisture and air, since the complexes are very sensitive to both. The preparation operations are normally conducted under a nitrogen atmosphere. The alkali metal chloride by-product precipitates from the solution and is removed by filtration or the like, whereupon the substantially pure crystalline complex of this invention may be isolated by removal of the organic liquid.

Although the above method provides a suitable copper(I)-diamine-phenoxide complex for polyphenylene oxide polymerization, manipulation of this complex is difficult due to its extreme air and moisture sensitivity. It is desirable to obtain a simplified process which provides the catalysis of copper(I)-diamine phenoxide complexes in the preparation of polyphenylene oxide without complicated operating steps.

SUMMARY OF THE INVENTION

One embodiment of this invention provides a method for producing a copper(I)-amine-phenoxide complex in solution comprising reacting at a temperature of about 0°–50° C., an alkali metal hydroxide, a monohydroxy aromatic compound of the formula

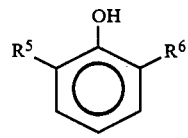

and copper-diamine halide complexes of the formulas

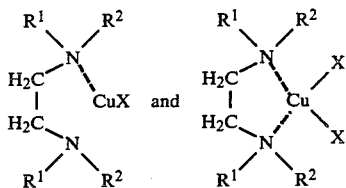

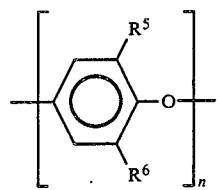

wherein X is halogen, $R^1$ is a hydrogen radical or an alkyl radical; $R^2$ is an alkyl radical, with the provisos that (1) $R^1$ and $R^2$ taken together contain 4–6 carbon atoms and (2) when $R^1$ is hydrogen, $R^2$ is tertiary alkyl; $R^5$ is hydrogen or a primary alkyl radical of from 1 to 7 carbon atoms and $R^6$ is hydrogen or a primary or secondary alkyl radical of from 1 to 7 carbon atoms; said solution comprising a polar aprotic organic liquid.

Another embodiment of this invention provides a method for preparing polyphenylene oxides which comprises oxidatively coupling monohydroxy aromatic compounds of the formula

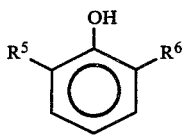

I in the presence of a copper(I)-amine complex having the formula

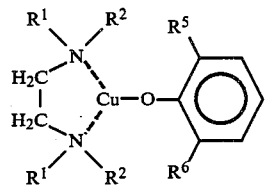

II said complex being generated within the polymerization medium by reacting an alkali metal hydroxide, a copper-diamine-halide complex and at least one of said monohydroxy aromatic compounds.

OBJECTS OF THE INVENTION

The primary object of the present invention is to provide a novel and relatively simple method for the preparation of polyphenylene oxides.

Another object of the present invention is to provide a simple method for utilizing copper(I)-diamine-phenoxide complexes as catalysts in the preparation of polyphenylene oxides.

Another object of the present invention is to provide a novel method for producing copper(I)-diamine-phenoxide complexes within a solution, such as the polymerization medium for polyphenylene oxides.

Other objects will be apparent from the disclosure herein.

DETAILED DESCRIPTION OF THE PREFERRED EMBODIMENTS

The present invention provides methods for preparing copper(I)-diamine-phenoxide catalysts in solution and improved methods for utilizing these catalysts in producing polyphenylene oxides of the formula wherein $R^5$ is hydrogen or a primary alkyl radical of from 1 to 7 carbon atoms, $R^6$ is hydrogen or a primary or secondary alkyl radical of from 1 to 7 carbon atoms and n is an integer preferably greater than 50.

The preferred polyphenylene oxides that are prepared by the process of this invention are those wherein $R^5$ and $R^6$ are independently selected from hydrogen and methyl. The especially preferred polyphenylene oxides are those wherein $R^5$ and $R^6$ are methyl.

The processes of this invention utilize a copper-diamine-halide complex, a monohydroxy aromatic compound and an alkali metal hydroxide. Suitable copper-diamine-halide complexes are the copper(I)-diamine-halide complexes of the formula

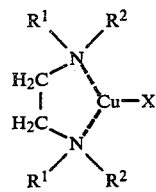

III and the copper(II)-diamine-halide complexes of the formula

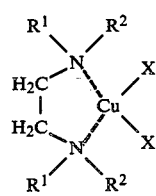

IV wherein $R^1$ and $R^2$ are as defined below and X is halogen, preferably chlorine or bromine. These complexes are not as sensitive to moisture and air as are the copper-(I)-diamine-phenoxide catalysts. Maintaining these complexes in solution is sufficient protection from moisture and air. Complexes having these structures may be prepared by reacting a cuprous halide or cupric halide with a diamine to provide the copper(I) or copper(II) complex, respectively. Typically, a mole ratio of diamine to the copper-halide halide between about 1:1 and about 2:1 is utilized. The reaction takes place in an organic solvent, most often a polar aprotic solvent such as acetonitrile, dimethylformamide, dimethylsulfoxide and the like. Suitable reaction temperatures are in the range of about 0° to 50° C., although generally no heating or cooling is required. The complex often precipitates spontaneously from the organic solvent upon formation; if it does not, it may be precipitated by addition of a non-solvent, by concentration of the solution followed by cooling or by other conventional methods. The complex may be retained in solution for subsequent use or it can be separated. This complex is easily handled and the scrupulous exclusion of air and moisture is unnecessary whether or not said complex is in solution. Mixtures of these complexes can be used in preparing the copper(I)-diamine-phenoxides.

The diamines are selected from the group represented by formula IV illustrated below.

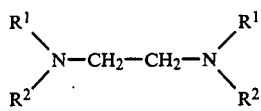

$R^1$ is selected from the group consisting of hydrogen and an alkyl radical and $R^2$ is an alkyl radical but the proviso is that (1) $R^1$ and $R^2$ taken together contain 4–6 carbon atoms and proviso (2) when $R^1$ is hydrogen, $R^2$ is a tertiary alkyl. Illustrative alkyl radicals are methyl, ethyl, N-propyl, isopropyl, N-butyl, isobutyl, secondary butyl and tertiary butyl. $R^1$ is preferably hydrogen and $R^2$ is preferably tertiary butyl. Typical diamines of formula V are N,N,N',N'-tetraethylethylenediamine and N,N'-di-t-butylethylenediamine, with the latter being preferred.

The copper-halide portion of the copper-diamine-halide complexes is provided by a cuprous-halide or cupric halide. Chlorine and bromine are the preferred halogen radicals on the copper species due to their high reactivity, cuprous chloride is the most preferred species. Cuprous halides provide the complexes of formula III and cupric halides provide the complexes of formula IV. The monovalent copper(I) three coordinate phenoxide-complexes provide the proper symmetry for activating the polyphenylene oxide reaction. The copper(II)-diamine-halides provide this symmetry by decomposing to the copper(I)-diamine-phenoxide on reaction with the monohydroxy aromatic compound.

Suitable alkali metal hydroxides utilized in the processes of this invention include sodium hydroxide, calcium hydroxide, potassium hydroxide, lithium hydroxide, magnesium hydroxide and the like. The preferred alkali metal hydroxide is potassium hydroxide since the potassium ion forms an insoluble salt with chlorine obtained from copper(i)-diamine-chloride.

The monohydroxy aromatic compounds which can react with the copper(I)-diamine-halides are of formula I, repeated once again below.

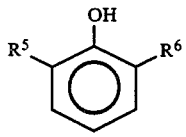

The radicals $R^5$ and $R^6$ are as previously defined. Preferably $R^5$ and $R^6$ are independently selected from the group consisting of hydrogen and methyl. Most preferably, both $R^5$ and $R^6$ are methyl due to the availability of this compound. Mixtures of these monohydroxy aromatic compounds may be used but it is preferable to utilize only one species of these compounds so as to produce a uniform catalyst system. Mixtures of monohydroxy aromatic compounds are typically utilized only when preparing polyphenylene oxides.

To prepare the copper(I)-diamine-phenoxide complexes in accordance with this invention, a copper-diamine-halide complex, monohydroxy aromatic compound and alkali metal hydroxide are dissolved in a suitable organic liquid where reaction takes place. Typically, the copper-diamine-halide is added to the aromatic monohydroxy compound subsequent to the alkali metal hydroxide, although this is not required. These constituents may be introduced as part of a solution. Suitable temperatures fall within the range of 0°–50° C., although no heating or cooling is required. The organic liquid is required to maintain the complexes produced free of moisture and isolated from air. Preferably, polar aprotic solvents such as acetonitrile, dimethylformamide, dimethyl sulfoxide and the like are used. Such liquids solubilize the copper(I)-diamine-phenoxide complex very well. Acetonitrile performs especially well and is preferred. Other suitable organic liquids are those utilized in the preparation of polyphenylene oxide, such as toluene and benzene. Where excess monohydroxy aromatic compound is present, as with polyphenylene oxide production, the monohydroxy aromatic compound can provide all or a substantial portion of the solvent system. However, the reactivity of the copper(I)-diamine-phenoxide complex within such a system is low due to poor solubility of said complex.

Once the copper(I)-diamine-phenoxide complex is formed in solution, this solution may be added to a polyphenylene oxide polymerization medium. Isolation of the complex, subsequent to precipitation, would require the scrupulous exclusion of moisture and air, which was required in the process described in copending application Ser. No. 572,036. Since isolation of the complex from solution is not necessary to achieve the desired objects of this invention, such procedures are not particularly desired. It is preferable to utilize a sufficient quantity of solvent to provide a solution containing about 10 weight % of the copper(I)-diamine-halide complex or less.

Another embodiment of the present invention is a method for preparing polyphenylene oxides which comprises oxidatively coupling monohydroxy aromatic compound having the formula

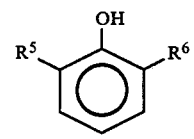

wherein $R^5$ and $R^6$ are as previously defined; in the presence of a copper(I)-diamine-phenoxide complex produced in the polymerization medium by reaction of a copper-diamine-halide complex, alkali metal hydroxide and at least one of said monohydroxy aromatic compounds.

Examples of lower primary alkyl groups suitable as the $R^5$ and $R^6$ moiety are methyl, ethyl, N-propyl, N-butyl, isobutyl, N-amyl, isoamyl, 2-methylbutyl, N-hectyl, 2,3-di-methylbutyl, 2-methylpentyl, 3-methylpentyl, 4-methylpentyl and the corresponding heptyl groups. Examples of secondary alkyl groups suitable as the $R^6$ moiety are isopropyl, sec-butyl, and 1-ethylpropyl. Preferably, $R^5$ and $R^6$ are straight chained rather than branched chained alkyl groups. Since the polyphenylene oxides in which $R^5$ and $R^6$ are other than methyl generally have no more desirable properties than those in which they are both methyl, and since 2,6-xylenol provides a reactive complex, is the most readily available and cheapest 2,6-dialkylphenol, its use is preferred.

To prepare polyphenylene oxides, oxygen is passed into a mixture of one or more monohydroxy aromatic compounds described above which contains a copper-diamine-halide and an alkali metal hydroxide at a temperature up to about 40° C. The reaction mixture may also contain a solvent such as toluene, benzene or acetonitrile, the latter being preferred because of the solubility of the copper(I)-diamine-halide complex therein. The mole ratios of copper:alkali metal hydroxide:-monohydroxy aromatic compound in this process are preferably in the range of about 1:1–20:300–1500 and is most preferably about 1:4–6:600–800. The oxygen is typically introduced at a rate of about 0.8 to 1.2 SCFH, and the amount of oxygen is generally about 0.5 to 1 mole per mole of monohydroxy compound. If desired, the oxygen may be diluted with inert gases or air can be used, but the use of pure oxygen is preferred.

This process will produce a uniform polymer where only one monohydroxy aromatic compound is used to form the polyphenylene oxides. This will also provide uniform phenoxide groups on the copper(I)-diamine-phenoxide complexes produced. For example, polymerizing only 2,6-xylenol will provide a copper(I)-diamine-2,6-xylenoxide catalyst.

Upon addition of the alkali metal hydroxide to the reaction medium, the alkali metal hydroxide reacts with the monohydroxy aromatic compounds to provide salts of said monohydroxy aromatic compounds. These salts will react with the copper-diamine-halide complex to produce the copper(I)-diamine-phenoxide complex catalysts of formula II. This reaction takes place immediately and does not require the addition of oxygen to commence. The formation of the phenoxide complex preferably takes place at a temperature in the range of about 0° to 50° C., well within the reaction temperatures preferred for polymerizing polyphenylene oxide.

The reaction between the salt form of the monohydroxy aromatic compound and the copper-diamine-halide complex also produces an alkali metal halide by-product which precipitates from solution. This alkali metal halide precipitate is in such a small quantity it does not need to be separated.

The monohydroxy compound is available in excess during formation of the catalyst since these compounds are the monomeric species for the polymerization reaction. The alkali metal hydroxide utilized preferably provides a ratio of copper-diamine-halide:alkali metal hydroxide in the range of about 1:1 to 1:15, the ratio of 1:6 being most preferred. The copper-diamine halide complex can be introduced to the polymerization medium with or without an organic solvent. The solvent being one of those described which are suitable for preparing polyphenylene oxides. Acetonitrile is preferred because of the high solubility of the halide complexes therein.

Although substantially pure copper-diamine-halide complexes and alkali metal hydroxides are preferred, materials which contain a small quantity of impurity are also within the scope of this invention.

The quantity of actual catalyst utilized, in terms of the copper-diamine-halide complex starting material is preferably at about 1 part per 1,000 parts by weight of the monohydroxy aromatic compound used to form the polyphenylene oxide polymer. Smaller quantities of the catalyst are expected to provide some catalysis and are deemed within the scope of the invention, as is the use of excess quantities of the catalyst.

Upon passage of oxygen through the above-described mixture, an exothermic reaction normally takes place and the monohydroxy compounds are oxidatively coupled. It is preferable to maintain the maximum temperature no higher than about 45° C., which maximizes the molecular weight of the polyphenylene oxide produced. Oxygen may be passed through the system after the formation of the phenoxide complex is complete, before the reaction commences or during the reaction which provides the catalyst. The latter being accomplished by gradual addition of the copper-diamine-halide.

When the polymerization reaction is complete, it may be desirable to remove traces of the copper entrained therein from the catalyst and the metal halide by-product. Removal of copper may be conveniently effected by treating with a sequestrant such as ethylenediaminetetraacetic acid or salt thereof. Depending on the solvent utilized, the polymer may precipitate as it is formed or it may remain in solution; in the latter instance, it may be recovered by conventional methods, such as precipitation by addition of a non-solvent.

The reaction will begin to provide polymers in about 1.5–20 minutes, depending on the quantity of active catalyst utilized. It is preferable to maintain the reaction time of initial polymer formation at about 2 minutes to maximize the efficiency of the process. Where a batch operation is utilized, the monohydroxy aromatic compound will completely react in about 30 to 90 minutes.

An advantage of this method is that it will produce relatively high molecular weight polymer in a short period of time and is relatively easy to perform.

The average molecular weight of the polymer produced typically are below 15,000. Polymers having an average molecular weight above 15,000 will typically precipitate from an acetonitrile solution, not permitting higher molecular weights to be achieved. These polyphenylene oxides obtained can be coupled to provide a product having a higher intrinsic viscosity.

The following examples are provided to illustrate the invention. They are not provided to limit the invention to the embodiments they describe. All parts are by weight unless indicated otherwise. Examples I-VIII demonstrate methods for the preparation of polyphenylene oxides within the scope of this invention and the methods for preparing copper(I)-diamine-phenoxide complexes in solution.

EXAMPLE I

To 10.0 grams of 2,6-xylenol were added 0.016 grams potassium hydroxide and 0.074 grams of copper(I)-diamine-chloride complex within a cylindrical glass tube, which provided a mole ratio of copper(I) complex:2,6-xylenol:KOH of 1:300:1. The copper(I) complex and potassium hydroxide were introduced in an acetonitrile solution. A small glass rod was inserted for introducing oxygen. Efficient oxygen dispersion was obtained by use of a vibromixer. A thermometer was also inserted to monitor reaction temperature throughout. An exotherm of 37° C. was obtained after 2 minutes. After exotherm, a constant temperature bath was used to maintain the reaction temperature at 35° C. for 2 more minutes. The sample of polymer was removed and immediately filtered. Precipitates were extracted with 10% sodium-ethylenediamine-triamine followed by reprecipitation from methanol. Gel permeation chromatography indicated the polymer had a weight average molecular weight of 11,000 based on polystyrene.

EXAMPLE II

This example demonstrates the use of copper(I)-diamine-bromine complex. An apparatus similar to that described in Example I was utilized. The starting materials comprised 0.085 gms of dibutylethylenediamine copper bromide, 10.0 gms of 2,6-xylenol and 0.015 gms of potassium hydroxide which provided molar ratios of 1:330:1 for copper:2,6-xylenol:KOH. The copper(I)-dimaine-bromine and KOH were added as a acetonitrile solution. The percent solids for the reaction mixture was kept at 20%. An exotherm of 35° C. was reached in 5 minutes upon addition of oxygen and the reaction mixture was maintained at this temperature for 5 more minutes. The resulting precipitate was treated as described in Example I and analyzed by gel permeation chromatography which indicated the polyphenylene oxide polymer product had a weight average molecular weight of 10.350.

EXAMPLES III-VI

In these examples the same procedure and apparatus described in Example I was utilized. The molar ratios of starting material varied in each Example to provide polymers of varying average molecular weights. These ratios are shown in Table I. The reaction temperature in each example was maintained at 35° C. after exotherm and the precent solids within the reaction mixtures was maintained at 20%. The polymer precipitate was isolated and analyzed by gel permeation chromatography as in Example I. The additional reaction time, exotherm temperature and time to exotherm varied slightly in each example and these values are provided in Table I with the weight average molecular weight of the polyphenylene oxide product.

TABLE I

Polymerization of 2,6 Xylenol Using Copper(I)-diamine-chlorine and KOH

| Example | 2,6-Xylenol | KOH | Cu* | Molar Ratio** | Exotherm Temp | Time to Exotherm | Addt'l. Reaction Time | Mw |
| --- | --- | --- | --- | --- | --- | --- | --- | --- |
| III | 8.12 | .011 | .058 | 300:1:1 | 34° C. | 3 min | 3 min | 11046 |
| IV | 10.0 | .005 | .027 | 815:1:1 | 36° C. | 17 min | 19 min | 4700 |
| V | 11.0 | .06 | .023 | 1045:12:1 | 38° C. | 1 min | 2 min | 7840 |
| VI | 12.2 | .10 | .026 | 1046:12:1 | 38° C. | 1 min | 2 min | 8940 |

*dibutyl ethylene diamine copper chloride
**2,6-xylenol:KOH:dibutyl ethylene diamine copper chloride

EXAMPLES VI-VIII

In these examples, the same procedure and apparatus described in Example I was utilized. The copper(II)-diamine-halide complex, dibutyl ethylene diamine copper dichloride, was utilized with potassium hydroxide in a polymerization medium containing 2.6 xylenol. The reaction temperature was maintained at 35° C. after exotherm and the percent solids was maintained at 20%. Exotherm was reached in 1 minute. The polymer precipitate was isolated and analyzed by gel permeation chromatography. The additional reaction time varied in each example. This value, along with exotherm temperature, quantities of reactants and weight average molcular weight of product are shown in Table II.

| Example | 2,6-Xyl* | KOH | Cu** | Molar Ratio*** | Exotherm Temp | Addt'l. Reaction Time | Mw |
| --- | --- | --- | --- | --- | --- | --- | --- |
| VII | 6.0 | 0.2 | .05 | 300:2:1 | 37° C. | 2 min | 10,400 |
| VIII | 6.0 | 0.2 | .05 | 300:2:1 | 36° C. | 60 min | 15,100 |

*2,6-xylenol
**dibutyl ethylene diamine copper dichloride
***2,6-xylenol:KOH:dibutyl ethylene diamine copper dichloride Although the above Examples have shown various embodiments of the present invention, modifications of these embodiments are possible by those skilled in the art and are deemed within the scope of this invention.

What is claimed is:

1. A method for preparing polyphenylene oxide which comprises oxidatively coupling monohydroxy aromatic compounds of the formula

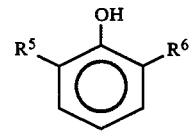

in the presence of a catalytic amount of a copper(I)-diamine-phenoxide complex of the formula

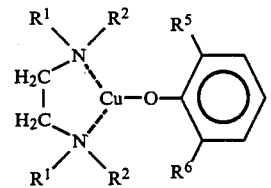

said complex being generated within the polymerization medium by reacting a monohydroxy compound of formula I with an alkali metal hydroxide and a complex selected from the group consisting of copper-diamine-halides of the formulas

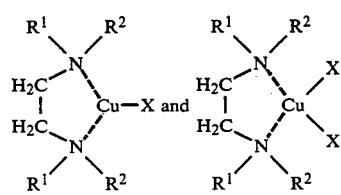

wherein $R^1$ is hydrogen or an alkyl radical; $R^2$ is an alkyl radical, subject to the provisos that (1) $R^1$ and $R^2$ taken together contain 4–6 carbon atoms and (2) when $R^1$ is hydrogen, $R^2$ is tertiary alkyl; X is halogen; $R^5$ is selected from the group consisting of hydrogen and primary alkyl radicals of from 1 to 7 carbon atoms and $R^6$ is selected from the group consisting of hydrogen, primary alkyl radicals of from 1 to 7 carbon atoms and secondary alkyl radicals of from 1 to 7 carbon atoms.

2. A method as in claim 1 wherein each of $R^5$ and $R^6$ is methyl.

3. A method as in claim 2 wherein $R^1$ is hydrogen and $R^2$ is tertiary butyl.

4. A method as in claim 3 wherein the copper-diamine-halide complex is of the formula

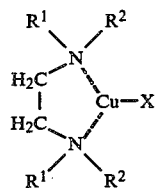

5. A method as in claim 3 wherein X is chlorine or bromine.

6. A method as in claim 3 wherein the alkali metal hydroxide is potassium hydoxide.

7. A method as in claim 1 wherein the polymerization medium contains a polar aprotic solvent.

8. A method as in claim 7 wherein the polar aprotic solvent is acetonitrile.

9. A method as in claim 4 wherein the ratios of copper(I)-diamine-halide complex:alkali metal hydroxide:-monohydroxy aromatic compound fall within the ratio 1:1–15:300–1000.

10. A method as in claim 4 wherein the polymerization medium is maintained at a temperature within the range of about 32° to 40° C.

11. A method as in claim 4 wherein polyphenylene oxides are recovered from solution after the oxidative coupling reaction proceeds for 2–5 minutes.

12. A method for preparing polyphenylene oxides which comprises oxidatively coupling 2,6-xylenol in the presence of a catalytic amount of a copper(I)-diamine-xylenoxide complex of the formula

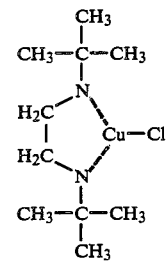

said complex being generated within the polymerization medium by reacting 2,6-xylenol, potassium hydroxide and a complex of the formula in a ratio within the range of 1:1–20:300–1500 at a temperature in the range of 0° to 50° C.

* * * * *